INVENTOR.
Hugh F. Jones
BY
Harness, Dickey & Pierce
ATTORNEYS

INVENTOR.
Hugh F. Jones
BY
Harness, Dickey & Pierce
ATTORNEYS.

INVENTOR.
Hugh F. Jones
BY
Harness, Dickey & Pierce
ATTORNEYS

INVENTOR.
Hugh F. Jones
BY
Harness, Dickey & Pierce
ATTORNEYS

INVENTOR.
Hugh F. Jones
BY
Harness, Dickey & Pierce
ATTORNEYS.

INVENTOR.
Hugh F. Jones
BY
Harness, Dickey & Pierce
ATTORNEYS.

INVENTOR.
Hugh F. Jones.
BY
Harness, Dickey & Pierce
ATTORNEYS.

United States Patent Office 3,751,354
Patented Aug. 7, 1973

3,751,354
ELECTROPLATING CELL INCLUDING MAGNETIC MEANS TO COUPLE CONCAVE WORKPIECES TO A PLATING RACK

Hugh F. Jones, Ann Arbor, Mich., assignor to Federal-Mogul Corporation

Filed Sept. 27, 1971, Ser. No. 183,754
Int. Cl. B65g 49/00
U.S. Cl. 204—198 9 Claims

ABSTRACT OF THE DISCLOSURE

An apparatus and process for electroplating the arcuate concave surfaces of workpieces, such as precision shell-type half bearings, employing a cell adapted to be immersed in an electrolyte and a work rack including a panel on which one or a plurality of semicylindrical workpieces are magnetically coupled with the concave surfaces thereof in aligned communication with an elongated slot therethrough and with the end edges thereof disposed in abutting bearing contact against the one face of the panel. Electrification of the workpieces while immersed in the electrolyte and supported in the cell is performed in a manner whereby a substantially uniform electroplating is obtained on the concave surface of the workpieces while the rear convex surfaces thereof are shielded and remain substantially devoid of any metallic deposit thereover.

BACKGROUND OF THE INVENTION

The apparatus and process as herein described is particularly applicable for applying an overplate of a suitable bearing metal on the accurately machined concave surface of precision shell-type half bearings which are in widespread use for rotatably supporting the journals of crankshafts and in connecting rods of internal combustion engines and the like. Metals typical of those used in forming such an overplate include lead, tin, copper and indium, as well as alloys thereof, which are applied in the form of a substantially uniform plating that may range from several ten-thousandths of an inch up to several thousandths of an inch in thickness. Accuracy and uniformity in the thickness of the metallic overplate applied to the precision machined concave bearing surface is important to assure a proper fit of the bearing with a journal to be rotatably supported thereby. It is also important that the rear or convex surface of such shell-type half bearings be substantially devoid of any plating deposit in order that an accurate supported fit of the bearing in the bearing cap is attained and no loosening subsequently occurs during operation of the engine due to the flow of the soft bearing metal inadvertently deposited on such back surfaces.

Such precision-type shell bearings are conventionally manufactured of a composite material comprising a bimetallic strip composed of a high-strength outer backing member, usually steel, to which an inner soft bearing material is tenaciously bonded and which comprises the concave bearing lining of the resultant fabricated bearing. The bearing lining may be applied to the steel backing by any one of a variety of known techniques, including powder metallurgical processes, casting, roll cladding, electrodeposition and the like. In any event, the bearing lining is comprised of metals which possess good anti-friction characteristics of which copper and copper-base alloys, aluminum and aluminum-base alloys are perhaps the most common.

In the fabrication of such shell-type bearings, the composite strip is subjected to various blanking and stamping operations to form a bearing of the desired size and configuration, whereafter the concave bearing lining is subjected to a final machining operation to assure a precision fit of the bearing with a journal. Thereafter, the bearing is subjected to an overplating operation in which, as previously indicated, a thin substantially uniform deposit of an overplate metal is applied to the concave bearing surface. In many instances, it is also desirable, prior to or subsequent to the electrodeposition of the overplate, to apply a flash of a suitable metal or metal alloy, such as tin for example, to the convex back surface of the bearing to enhance its appearance and inhibit corrosive attack of the steel backing. In accordance with known prior art processes and apparatuses, it has been necessary to effect a re-racking of the bearings between the overplating process and the back-plating process in order to obtain a uniform and adherent deposit over the desired surface areas. Such re-racking has occasioned a substantial increase in the cost and time required in the manufacture of such bearings, as well as in subjecting the precision surfaces thereof to possible damage during such further handling operations.

Typical of the devices and techniques heretofore used in electroplating the concave surfaces of precision shell-type half bearings and other similar arcuate workpieces are the so-called box-type plating racks such as disclosed in U.S. Pat. No. 3,331,764. Box-type plating racks have not been entirely satisfactory because of the difficulty usually encountred during the loading and unloading of bearings therefrom, as well as the excessive degree of solution drag-out and drag-in from one plating tank to the next adjoining plating tank. Some of the problems associated with box-type plating racks is overcome by the apparatus described in U.S. Pat. No. 3,133,007, utilizing a plating cell stationarily disposed in an electroplating tank in which stacked columns of arcuate workpieces are immersed in the cell while supported on a suitable workpiece holder. A still further improvement in the processing of such bearings is described in U.S. Pat. No. 3,522,165, in which a panel-type work holder is employed for transporting stacked columns of arcuate workpieces from one liquid treating station to the next adjoining treating station. Each of the aforementioned United States patents are owned by the same assignee as the present invention and while the mechanisms described therein provide for satisfactory processing efficiency in many instances, they have been found deficient in some respects, particularly in their adaptation to modern, fully-automatic workpiece handling and loading-unloading mechanisms. It will also be noted that the foregoing mechanisms require a re-racking of the bearings between the overplating operation and the plating step in which a flash of tin, for example, is applied to the back convex surfaces of the workpieces.

The apparatus and method comprising the present invention comprises still a further advancement in the technique of handling semicylindrical workpieces in an electroplating process which not only eliminates the problems associated with solution drag-out and drag-in, but also substantially facilitates an automatic loading and unloading of the workpieces from the work rack. In addition to the foregoing, the apparatus and technique of the present invention also assures appropriate aligned communication of the concave surfaces of the workpieces with the elongated aperture through which the metallic ions pass, assuring uniformity in the plating deposit and assuring a close-fitting relationship, whereby no substantial electrodeposit inadvertently occurs on the rear convex surfaces of such bearings. In this connection, prior art type apparatuses, after usage over prolonged periods of time, have been known to undergo a warpage of certain structural components thereof, whereby less than optimum workpiece fits are attained such that progressively increased plating deposits occur on unwanted surfaces.

SUMMARY OF THE INVENTION

The advantages and benefits of the present invention are achieved by an apparatus which includes a cell adapted to be immersed in an electrolyte contained in a suitable receptacle or tank. A work rack including a panel is adapted to be removably received and supported in the cell and includes a panel formed with at least one elongated aperture therethrough and magnetic means for magnetically coupling one or a plurality of concave workpieces to one face of the panel in a manner such that the concave surfaces thereof are disposed in aligned communication with the elongated aperture. The workpieces are retained with their end edges seated in abutting contact against the one face of the panel and with their side edges disposed in abutting contact against the side edges of adjacent workpieces which are arranged in the form of a stacked column extending along the elongated aperture. Electrification of the workpiece or workpieces is achieved by a contact disposed in electrical connection with the uppermost workpiece to effect an electrification thereof while the work rack is immersed in an electrolyte for causing current to flow through the solution and through the elongated aperture between the electrodes such as an anode disposed on the opposite face of the panel and the concave surfaces of the workpieces. By virtue of the magnetic coupling of the workpieces to the panel, no mechanical retaining devices are required whereby the entire rear surface of the bearings are exposed and in which condition they can readily be subjected to a flash plating for appearance and anti-corrosion purposes without requiring a re-racking of the stacked column of bearings on the work rack. The open construction of the work rack also provides for a substantial simplification in the loading and unloading of the workpieces therefrom, as well as substantially minimizing solution drag-out and drag-in from one treating receptacle to the next adjoining treating receptacle.

Still further advantages and benefits of the present invention will become apparent upon a reading of the description of the preferred embodiments, taken in conjunction with the accompanying drawings.

DESCRIPTION OF THE PREFERRED EMBODIMENTS

Figure 1:
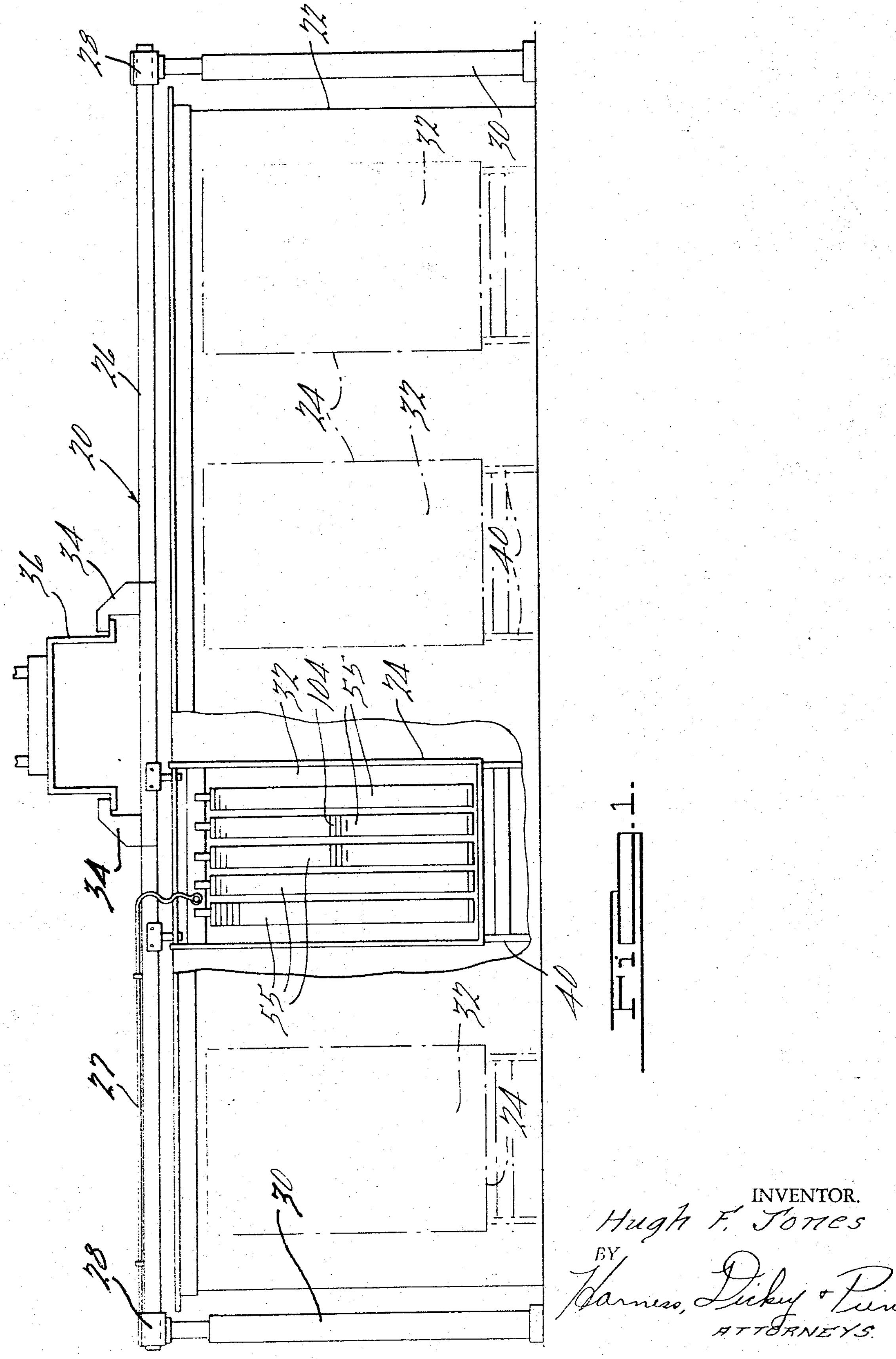
FIG. 1 is an end elevational view, partly in section and partly schematic, illustrating a treating receptacle provided with a plurality of cells and a work rack provided with a corresponding number of panels which are adapted to be removably supported in each cell.
Figure 2:
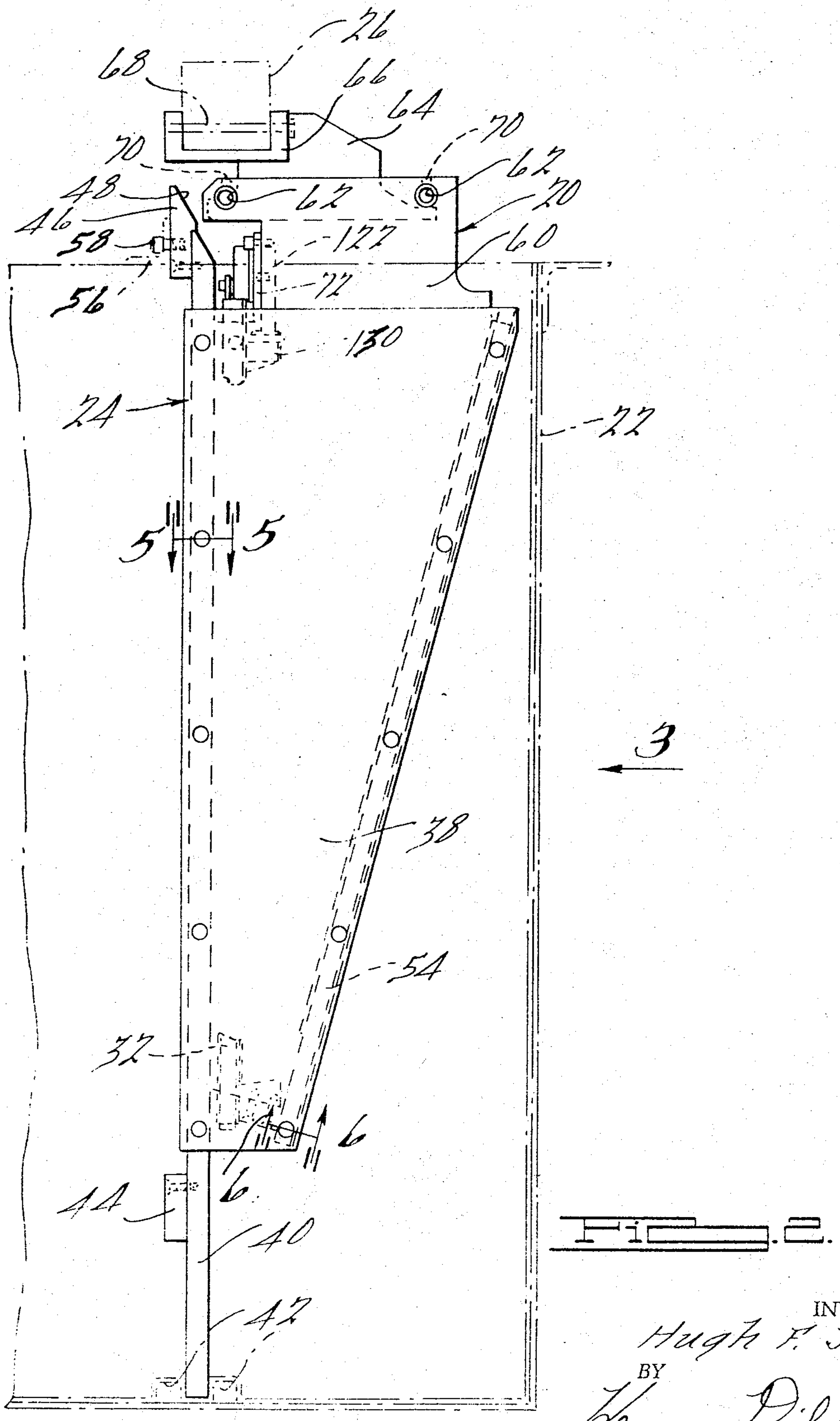
FIG. 2 is a fragmentary side elevational view of a treating receptacle including a cell having a work rack removably supported therein.
Figure 3:
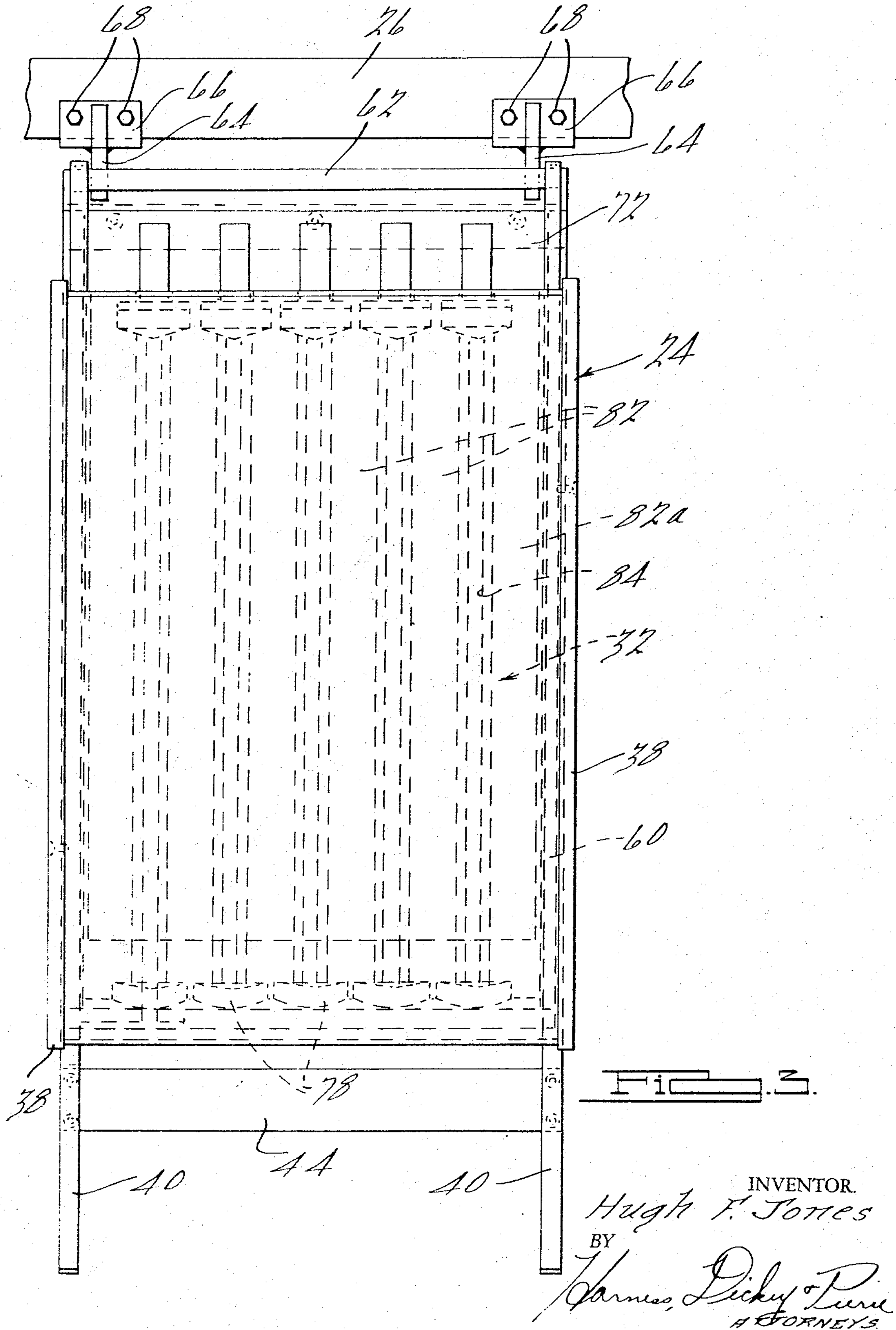
FIG. 3 is a rear elevational view of the cell and work rack shown in FIG. 2, as viewed in the direction of the arrow indicated at 3.
Figures 4, 5, 6:
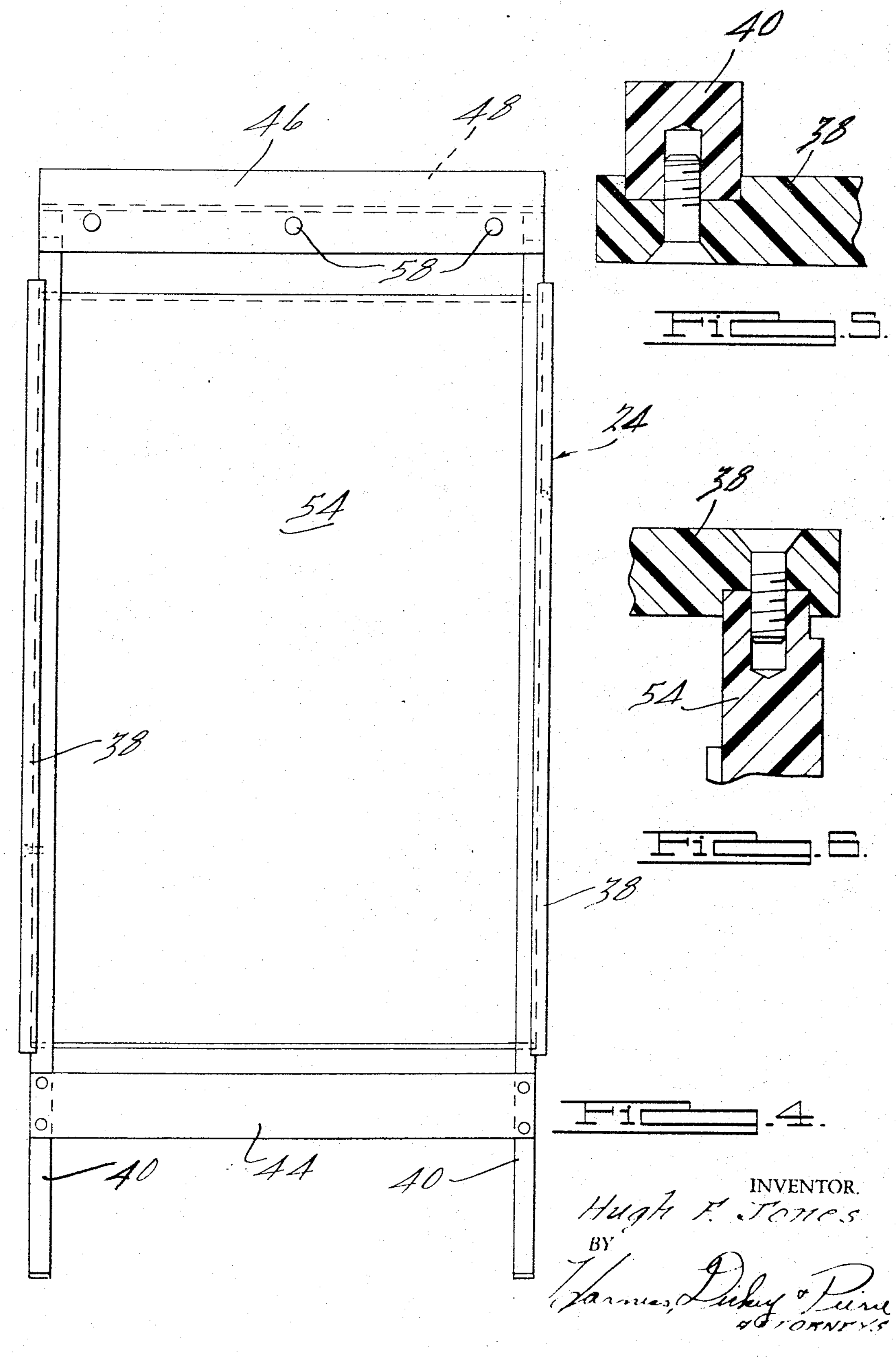
FIG. 4 is a front elevational view of the cell itself.
FIG. 5 is a fragmentary transverse sectional view taken through the forward corner edge of the cell shown in FIG. 2, and taken substantially along the line 5—5 thereof.
FIG. 6 is a fragmentary transverse sectional view taken through the rearward corner of the cell shown in FIG. 2, and taken substantially along the line 6—6 thereof.

Referring now in detail to the drawings, and as may be best seen in FIGS. 1–3, the apparatus comprising the present invention includes a work rack, indicated at 20, which is transportable above a treating receptacle 22 containing a suitable electrolyte and which further includes one or a plurality of cells 24 stationarily mounted therein. As shown, the work rack 20 comprises a transversely extending work bar 26 which, when in the lowered position, is adapted to be supported at its end portions by saddles 28 mounted on stanchions 30 located at each side of the treating receptacle. The work bar 26 is provided with one or a plurality of flexible conductor cables 27, as shown in FIG. 1, which extend between a work panel 32 and a contact at the end of the work bar whereby an electrification of the saddles 28 is operative to effect a corresponding electrification of the stacked column of workpieces on the work panel at those stations at which an electroplating or electrochemical operation is to be performed. The work bar also is provided with suitable engaging members 34 affixed to and projecting upwardly of the upper surface thereof which are adapted to be engaged by a support member 36 connected to a suitable conveying mechanism (not shown) which is employed to raise and lower the work rack above the treating receptacle and to effect a conveyance thereof longitudinally from one receptacle to the next adjacent receptacle in accordance with the prescribed process.

As best seen in FIGS. 1–4, the cell 24 comprises a generally triangular upwardly divergent cavity defined by a pair of triangular side members 38 securely affixed along their forward edges to legs 40 which extend downwardly with their lower ends removably disposed between a pair of transversely extending members 42 secured to the base of the treating receptacle 22. The legs of the cell are further rigidified by means of a lower cross member 44 and an upper cross member 46 securely affixed thereto such as by means of screws or the like. The upper cross member 46 is formed with a chamfered upper edge, indicated at 48, to provide for a camming action, facilitating the downward guided movement of the work panel during the descending movement of the work rack. If desired, transversely extending shield members (not shown) can be secured to the forward edges of the legs 40 or of the side members 38 at positions overlying the uppermost and lowermost workpieces in the stacked columns providing therewith a controlled degree of shielding so as to assure a substantially uniform electroplating on the entire stacked column of workpieces.

The back of the cell 24 is provided with a substantially impervious back panel 54 which is securely affixed between the angularly extending rearward edges of the side members 38 and extends from a position adjacent to the base thereof upwardly to a position above the level of the solution in a treating receptacle. The rear panel 54 is secured as may be best seen in FIG. 6 and functions as a shield to prevent or substantially eliminate the deposit of any metallic plating on the convex back surfaces of the workpieces during an overplating operation. It will be apparent from the foregoing arrangement that the plating cell is open at the bottom and is disposed in communication with the solution through the rectangular opening in the front of the cell so that the work rack panels 32, incorporating a plurality of stacked columns of workpieces such as indicated at 55 in FIG. 1, can be guidably received and supported therein in response to a lowering of the work bar by a suitable conveying mechanism. Appropriate transversely spaced aligned relationship of the plating cell 24 across the treating receptacle 22 as shown in FIG. 1 is achieved by an angle iron stringer 56, as best seen in FIG. 2, which is secured such as by means of screws 58 to the upper cross member 46 of each cell and wherein the end portions of the stringer 56 are securely affixed to the upper edge of the treating receptacle.

Figures 8, 9, 10:
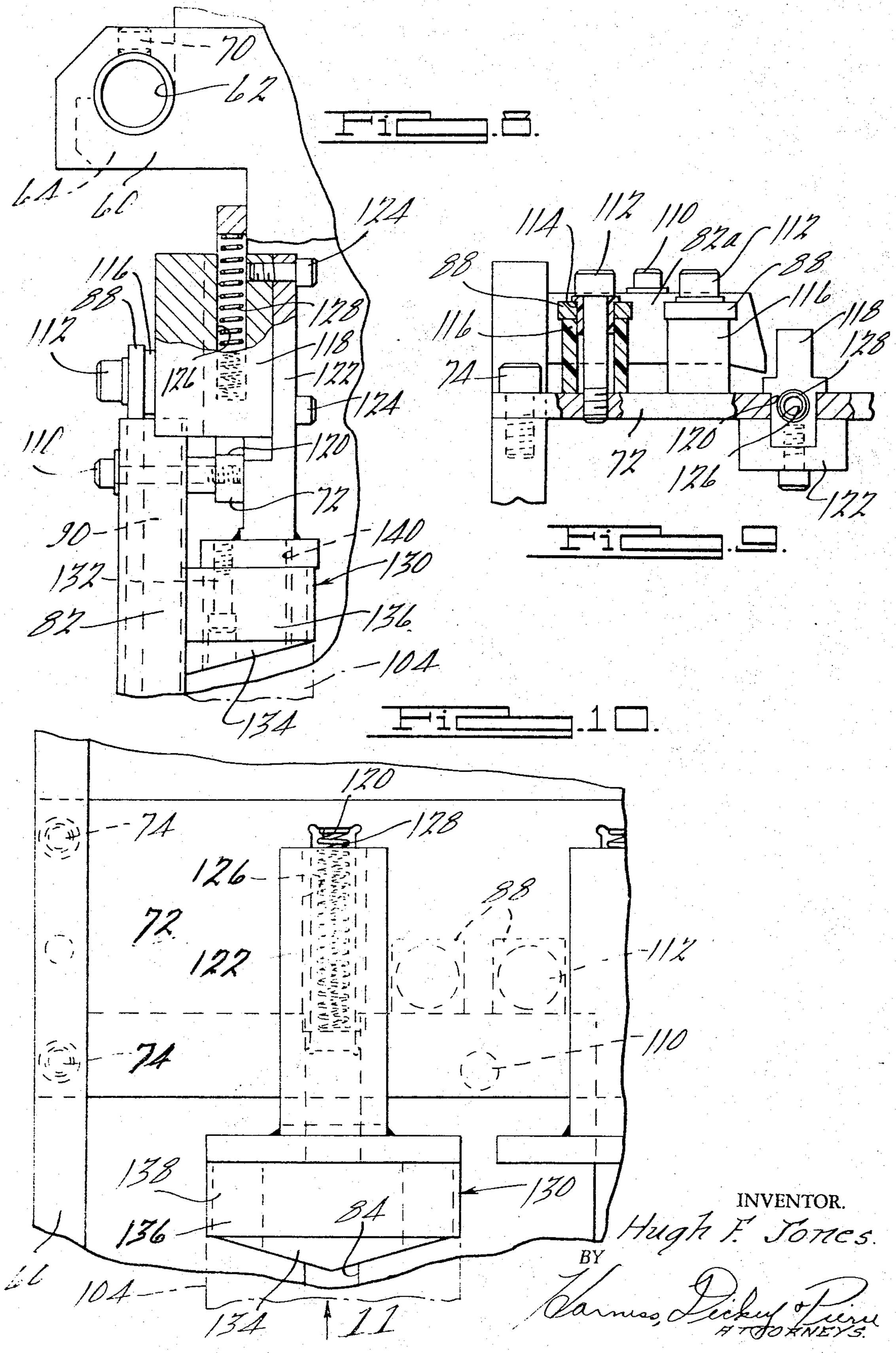
FIG. 8 is a fragmentary side elevational view, partly in section, of the resiliently biased electrical contact disposed at the upper end of the work rack panel shown in FIG. 7.
FIG. 9 is a fragmentary plan view of the upper end portion of the work rack.
FIG. 10 is a fragmentary end elevational view of the contact shoe shown in FIG. 8.

Each work rack panel 32 is comprised of a pair of triangularly-shaped side members 60 which are of a size and configuration so as to be slidably received in the upwardly divergent cavity of the treating cell. The side members 60, as in the case of the plating cell 24, are comprised of a material which is resistant to the various alkaline and acidic solutions used in electrochemical processes such as synthetic plastic materials, of which polyvinyl chloride is particularly satisfactory. The upper ends of the side panels 60 are secured to a pair of spaced transversely extending metallic tubes 62, which in turn are engaged by a pair of transversely spaced brackets 64, which are provided with U-shaped clamps 66, as best seen in FIGS. 2 and 3, that are securely fastened to the work bar 26 by means of through bolts 68. The ends of the tubes 62 are slidably disposed in appropriate apertures formed in the upper portion of the side members 60 and are suitably locked therein by socket heat set screws 70, as best seen in FIG. 8.

Figure 7:
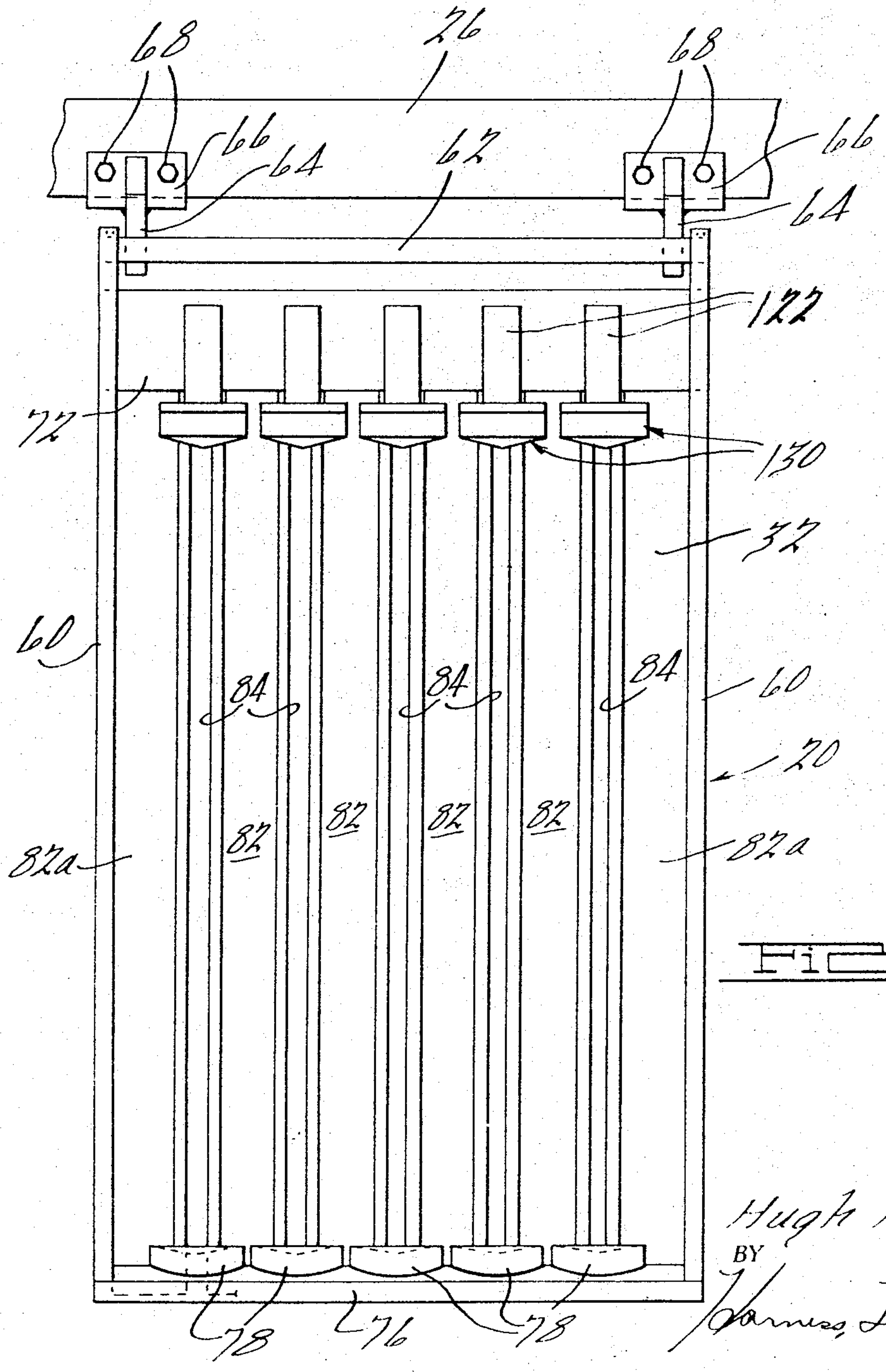
FIG. 7 is a rear elevational view of a work rack panel.
Figure 13:
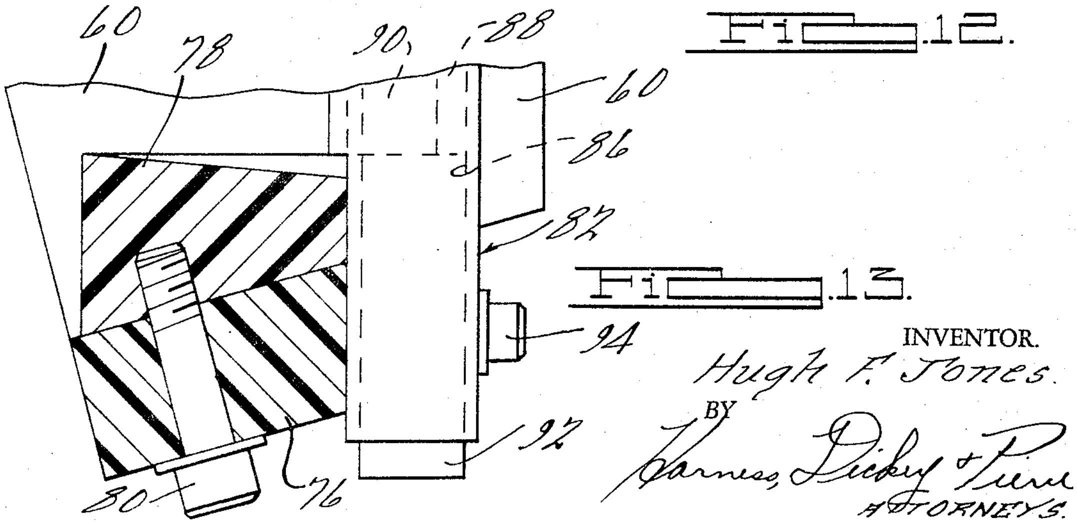
FIG. 13 is a fragmentary vertical sectional view of the lower end portion of a work rack as shown in FIG. 12, and taken substantially along line 13—13 thereof.

As may be best seen in FIGS. 7 through 10, a metal cross plate 72, which preferably is comprised of a type 302 stainless steel, extends between the side members 60 and is securely fastened by means of screws 74 to a vertical edge of the upper notched section of the side panels and serves as the mounting platform for the contacts and slotted panel members as hereinafter described. The lower ends of the side panels are interconnected by an angularly inclined cross member 76, as best seen in FIGS. 7 and 13 on which a plurality of arcuate base supports 78 are securely affixed such as by means of screws 80.

Figure 11:
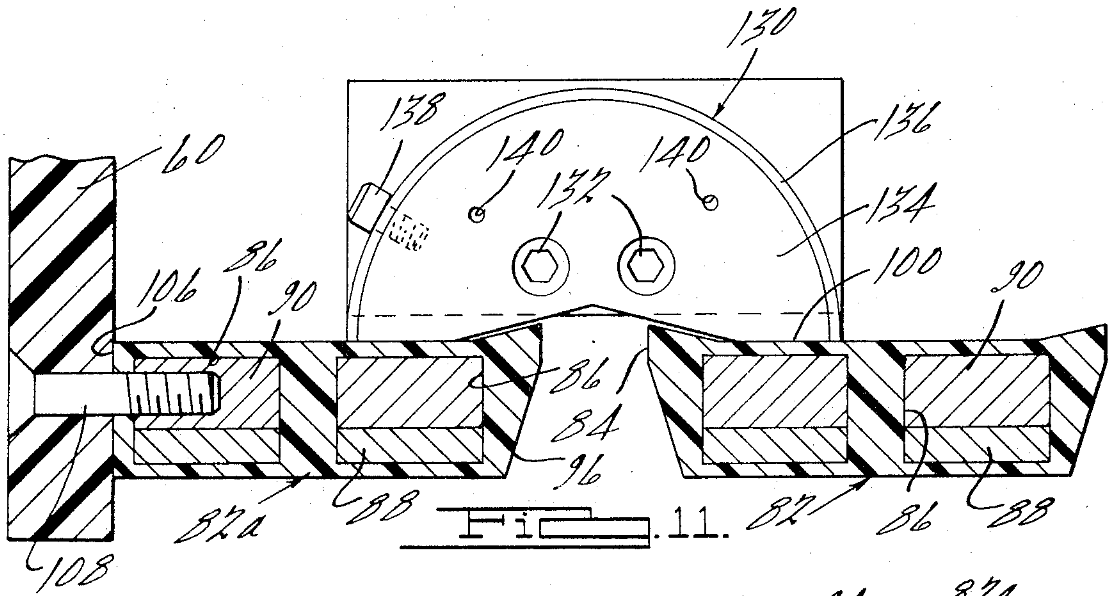
FIG. 11 is a plan view, partly in section, of the end contact shoe and panel as viewed from the underside in the direction of the arrow indicated at 11 in FIG. 10.
Figure 12:
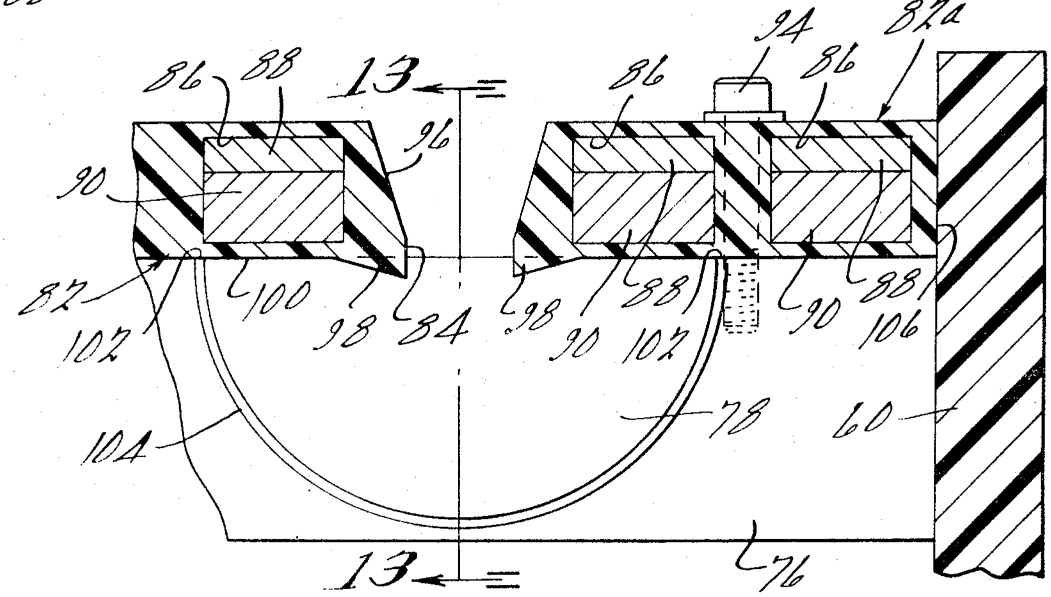
FIG. 12 is a fragmentary plan view, partly in section, of the lower end portion of the work rack panel.

To the resulting rectangular framework as defined by the side members 60, the tubes 62, the cross plate 72 and the lower cross member 76, a plurality of elongated magnetic members 82 are mounted in a manner so as to define a series of elongated slots 84 against one face of which the stacked column of arcuate workpieces are adapted to be disposed in aligned communication therewith. The magnetic members 82, as best seen in FIGS. 11–13, are comprised of a web of a nonconductive material, such as polyethylene, which is formed with two rectangular-shaped apertures 86 extending through the entire length thereof. Each aperture is filled with a steel strap 88 that extends from a position spaced above the lower end of the web to a position in which it projects upwardly beyond the upper end of the web. One or a plurality of magnetic elements 90 are disposed in overlying contact with the steel strap and are oriented so as to magnetically couple magnetizable workpieces to one face of the elongated member 82. The steel strap 88 and magnets 90 terminate at a point spaced from the lower end of the elongated magnetic member, as best seen in FIG. 13, and the lower portion of each of the apertures 86 is filled and sealed with a suitable plug 92 which may conveniently be comprised of the same material as the web itself. The lower portion, as shown in FIG. 13, of each magnetic member is securely fastened to the cross member 76 by means of a screw 94.

The side edges of the magnetic member 82, as best seen in FIGS. 11 and 12, are formed so as to provide a preferred slot configuration corresponding to that disclosed in U.S. Pat. No. 3,331,764 to which reference is made for further details thereof. The slot 84, as shown, is provided with an outwardly tapered throat 96 which extends for the entire length of the elongated magnetic member and is further provided with an angularly extending lip 98 which projects rearwardly of the inner surface 100 against which the end edges 102 of the arcuate workpieces, such as a shell-type half bearing 104, as indicated in FIG. 12, are seated in abutting contact.

Usually, the width of the slot is controlled within a range corresponding to about 20% to about 42% of the diameter of the concave surface of the arcuate workpiece and the rear face of the lip 98 is controlled so as to be within an angularity of from about 7° to about 15° with respect to a plane disposed parallel to the inner surface 100 of the elongated member. The transverse width of each of the lips 98 is usually controlled within a range of about 12% to about 40% based on the diameter of the concave surface being plated. By controlling the configuration of the slot within the aforementioned ranges, a substantial improvement in the uniformity of the thickness of the metallic plating deposited on the concave surface is attained. It will be understood that alternative satisfactory slot configurations also can be employed in cell plating systems of the present invention, achieving thereby increased benefits in the simplicity and efficiency of handling and processing semi-cylindrical workpieces.

In the specific work rack shown in the drawings, four elongated magnetic members 82 are employed along with two elongated magnetic members **82*a*, which are identical in all respects to the magnetic members 82 except that the side adjacent to the side members 60 is formed with a square edge 106, as best seen in FIG. 11, to facilitate attachment thereof, such as by means of a screw 108, to the inner surface of the side member. This arrangement, accordingly, provides for five elongated slots 84, against which the stacked columns 55 of the individual arcuate workpieces, such as the bearings 104**, are adapted to be disposed in aligned communication.

The upper ends of the magnetic members are secured by means of an elongated screw 110, as best seen in FIGS. 8–10, extending through the web between the rectangular apertures to a tapped aperture in the cross plate 72. The upper projecting end of each of the steel straps 88 is also securely fastened to the cross plate 72 by means of a screw 112 as best seen in FIGS. 8 and 9, which is insulated therefrom by means of an insulating sleeve 114 which is seated within a tubular spacer collar 116. Accordingly, the steel straps remain insulated from the electrified cross plate 72 which is electrically connected to the flexible conductor cable 27 (FIG. 1) for electrifying the stacked column of workpieces through an end contact mechanism in a manner as hereinafter described.

A resiliently-biased end contact mechanism, as is best seen in FIGS. 7–11, is mounted on the cross plate 72 in alignment with the elongated slots 84 and in opposition to the arcuate base support 78 at the lower end of the work panel. The end contact mechanism as shown comprises a flanged slide 118 which is slidably disposed in a rectangular-shaped aperture 120 through the cross plate and oriented with its major axis in alignment with the axis of the slot 84. A T-shaped member 122 is secured, such as by means of screws 124, to the slide 118 on a side opposite of the flange thereof, as most clearly shown in FIG. 8. The flange slide 118 is provided with a longitudinally extending bore 126 which opens outwardly of the upper end thereof and in which a coil spring 128 is seated in a manner such that its upper end is disposed in bearing contact against the upper edge of the rectangular aperture 120. Accordingly, the slide and T-shaped member are biased downwardly into clamping engagement against a stacked column of workpieces disposed between a composite contact shoe 130 secured by means of screws 132 to the lower face of the T-shaped member and the base support 78 at the lower end of the work panel.

The composite contact shoe 130, as best seen in FIGS. 8, 10 and 11, is comprised of an arcuate plug 134 of an insulating material, such as polyvinyl chloride for example, around the periphery of which an electrically conductive shell 136 is removably secured, such as by means of a screw 138. The exterior convex surface of the conductor shell 136 is coated with a suitable insulating material so as to prevent electrodeposition of metals thereon while the lower edge, which is adapted to be disposed in bearing electrical contact against the side edge of the uppermost arcuate workpiece, is uncoated. Similarly, the side edge of the conductor shell 136 disposed adjacent to the horizontal flange of the T-shaped member is uncoated and is disposed in electrical bearing contact thereagainst. Preferably, the electrically conductive shell 136 itself comprises an arcuate workpiece or may comprise an alternative satisfactory conductive material formed of an arcuate configuration corresponding to that of the workpieces to be electroplated.

The plug 134 and the horizontal flange of the T-shaped member are provided with venting apertures 140 to provide for a venting of any gases that may accumulate during an electroplating operation. The lower portion of the plug 134 is provided with an angular downwardly projecting surface contour, as best seen in FIGS. 8 and 10, to facilitate an alignment of the composite contact shoe with the uppermost workpiece in the stacked column.

Referring now to FIGS. 7, 12 and 13, it will be noted that the arcuate base supports 78 are formed along their upper surface with a generally dish-shaped contour for facilitating a drainage of any liquid treating solution outwardly through the lower end of the slot 84 as the work rack is withdrawn from a treating receptacle.

In accordance with the work panel arrangement as hereinbefore described, the end edges of arcuate workpieces, such as the workpiece 104 shown in FIG. 12, are magnetically coupled to the rear face 100 of the elongated members and are maintained in appropriate aligned communication with the elongated slot 84 extending therealong. The combination of the magnetic force exerted on the magnetizable workpieces in combination with the axial clamping force exerted by the resiliently-biased composite contact shoe serves to maintain the workpieces in stacked relationship in spite of forces imposed thereon during their conveyance and during the immersion and withdrawal of the work panels from the liquid treating solutions. The magnetic coupling exerted against the side edges further assures that the stacked column remains in substantially sealed relationship around the slot in spite of any warpage that the elongated members may undergo as a result of being subjected to corrosive attack by solutions at elevated temperatures, thereby preventing any appreciable electrodeposit on the side edges and convex back surfaces which would otherwise interfere with proper bearing fit.

It will be further appreciated that the fixed disposition of the plating cells in a receptacle enables optimum location of electrodes, such as anodes, relative to the elongated slots in the work panel, further assuring increased plating efficiency and uniformity in the metal deposited. The slotted work panel when disposed in seated close-fitting relationship within the cell defines an anodic compartment whereby a flow of current occurs through the electrolyte and through the slot 84 between the cathodically charged concave surfaces of the workpieces and the anodically charged electrodes or anodes disposed on the opposite side of the work panel. The convex rear surfaces of the workpieces are shielded to prevent any appreciable deposition of an electroplating thereon. In those instances where workpieces having oil holes or grooves are being processed, any tendency of plating deposit to occur on the back convex surfaces adjacent to the holes or grooves can be substantially eliminated by the careful positioning of cathodically charged robber electrodes in the cell adjacent to the rear convex surfaces of the workpieces.

As previously indicated, at the completion of an overplating operation, the back convex surfaces can readily be provided with a flash plating of a suitable metal, such as tin for example, by simply immersing the work panel and the stacked column of bearings thereon in a treating receptacle which is not provided with a cell and wherein no shielding of the arcuate convex back surfaces is provided. No re-racking of the workpieces under such circumstances is necessary.

It will be further appreciated that the fastening of the several components to each other by screws provides for quick and efficient assembly and disassembly of the work rack panels and the individual cells to effect a replacement of any components which may have become worn during use. In addition, the removability of the composite contact shoe 130 by extracting the screws 132 enables the work rack to be quickly converted for use with workpieces of a different diameter by substituting a corresponding shoe having a shell 136 of a diameter corresponding to the new workpieces.

While it will be apparent that the invention herein disclosed is well calculated to achieve the benefits and advantages as hereinabove set forth, it will be appreciated that the invention is susceptible to modification, variation and change without departing from the spirit thereof.

What is claimed is:

1. In an apparatus for electroplating the concave surfaces of arcuate semi-cylindrical workpieces, the combination comprising a receptacle adapted to be at least partially filled with an electroplating solution, a work rack comprising a panel having a workpiece mounting face comprised of an electric insulating material formed with at least one elongated aperture therethrough, magnetic means embedded in said panel in spaced relationship from said mounting face for magnetically coupling a concave workpiece to said panel with the concave surface thereof disposed in aligned communication with said aperture and with the end edges thereof disposed in bearing contact against said mounting face of said panel, a cell in the receptacle for receiving and supporting said panel when immersed in the solution, and contact means disposed in electrical contact with the side edge of a workpiece on said panel for effecting an electrification thereof and causing current to flow through said solution and through said elongated aperture between the workpiece and an electrode disposed on the opposite face of said panel.

2. The apparatus as defined in claim 1, wherein said panel further includes a support on said mounting face disposed in opposed relationship to said contact means adapted to removably engage the side edge of a workpiece magnetically coupled to said panel for maintaining the workpiece in appropriate longitudinal disposition therealong.

3. The apparatus as defined in claim 1, in which said work rack is formed with a plurality of said elongated apertures disposed in spaced apart relationship.

4. The apparatus as defined in claim 1 wherein said elongated aperture is of a length sufficient to accommodate a plurality of workpieces in the form of an aligned column in which the workpieces are disposed in side-edge to side-edge stacked abutting contact and with the end edges thereof magnetically coupled to said mounting face of said panel.

5. The apparatus as defined in claim 1, wherein said cell is formed so as to support said panel when disposed therein in a manner to shield the rearward surface of the workpiece from the flow of electric current to minimize electrodeposition of a plating thereon.

6. The apparatus as defined in claim 1, further including cooperative guide means on said work rack and said cell for guidably positioning said panel during the descending movement of said work rack into a receptacle.

7. The apparatus as defined in claim 1, wherein said work rack further includes supporting means for suspending said panel over said cell, said supporting means adpated to be disposed in electrical contact with a source of electric current for electrifying said contact means on said panel at stations at which an electrochemical treatment is to be performed.

8. The apparatus as defined in claim 1, wherein said work rack further comprises an electrically conductive work bar adapted to extend transversely of a receptacle and to which a plurality of said panels are secured, said work bar adapted to be supported by electrified supporting means disposed adjacent to a receptacle in which an electrochemical process is to be performed, said work bar electrically connected to said contact means for effecting an electrification of a workpiece in response to electrification of said work bar.

9. The apparatus as defined in claim 1, in which said panel comprises a plurality of elongated members mounted in spaced substantially parallel relationship and defining therebetween said elongated apertures.

References Cited

UNITED STATES PATENTS

| | | | |
|---|---|---|---|
| 2,500,206 | 3/1950 | Schaefer et al. | 204—297 R |
| 2,911,347 | 11/1959 | Gutzmer | 204—297 M |
| 3,331,764 | 7/1967 | Beebe, Jr., et al. | 204—297 R |
| 3,290,239 | 12/1966 | Anderson et al. | 204—297 R |
| 1,168,280 | 1/1916 | Buch | 204—297 M |
| 3,522,165 | 7/1970 | Jones et al. | 204—198 |

JOHN H. MACK, Primary Examiner
W. I. SOLOMON, Assistant Examiner

U.S. Cl. X.R.

204—297 M, 297 W